(12) United States Patent
Chui et al.

(10) Patent No.: US 8,351,793 B2
(45) Date of Patent: Jan. 8, 2013

(54) FREE SPACE OPTICAL COMMUNICATION WITH OPTICAL FILM

(75) Inventors: Clarence Chui, San Jose, CA (US); Manish Kothari, Cupertino, CA (US)

(73) Assignee: Qualcomm Mems Technologies, Inc., San Diego, CA (US)

( * ) Notice: Subject to any disclaimer, the term of this patent is extended or adjusted under 35 U.S.C. 154(b) by 607 days.

(21) Appl. No.: 12/256,242

(22) Filed: Oct. 22, 2008

(65) Prior Publication Data

US 2010/0098430 A1 Apr. 22, 2010

(51) Int. Cl.
*H04B 10/00* (2006.01)
(52) U.S. Cl. ........ 398/130; 398/118; 398/127; 398/128; 398/129; 398/131; 385/129; 362/602; 362/606
(58) Field of Classification Search .......... 398/118–120, 398/126–131, 140–142, 172; 385/129, 146; 362/31, 600–634
See application file for complete search history.

(56) References Cited

U.S. PATENT DOCUMENTS

| | | | | |
|---|---|---|---|---|
| 4,672,187 A | * | 6/1987 | Fujita et al. | 250/201.5 |
| 4,797,867 A | | 1/1989 | Sunagawa et al. | |
| 5,153,860 A | * | 10/1992 | Sunagawa et al. | 369/44.12 |
| 6,123,431 A | * | 9/2000 | Teragaki et al. | 362/625 |
| 6,967,754 B2 | * | 11/2005 | Bratt et al. | 359/15 |
| 7,421,163 B1 | | 9/2008 | Tong et al. | |
| 2003/0128538 A1 | * | 7/2003 | Shinohara et al. | 362/31 |
| 2003/0169385 A1 | * | 9/2003 | Okuwaki | 349/65 |
| 2004/0228109 A1 | * | 11/2004 | Leu et al. | 362/31 |
| 2004/0264910 A1 | * | 12/2004 | Suzuki et al. | 385/146 |
| 2005/0002175 A1 | * | 1/2005 | Matsui et al. | 362/31 |
| 2006/0262562 A1 | * | 11/2006 | Fukasawa et al. | 362/615 |
| 2008/0122994 A1 | | 5/2008 | Cernasov | |

FOREIGN PATENT DOCUMENTS

| | | |
|---|---|---|
| JP | 63 164034 | 7/1988 |
| JP | 05 047030 | 2/1993 |
| WO | WO 99/59271 | 11/1999 |
| WO | 2010/048318 | 4/2010 |

OTHER PUBLICATIONS

International Search Report and Written Opinion dated Jun. 22, 2010, from Application No. PCT/US2009/061523.
International Partial Search Report dated Apr. 19, 2010 issued in Application No. PCT/US2009/061523.
International Preliminary Report on Patentability mailed May 5, 2011, from Application No. PCT/US2009/061523.

* cited by examiner

*Primary Examiner* — Li Liu
(74) *Attorney, Agent, or Firm* — Weaver Austin Villeneuve & Sampson LLP

(57) ABSTRACT

Devices and systems are provided for free space optical communication using optical films. Some embodiments involve using an optical film for the transmission and/or reception of light in a free space optical communication system. Some free space optical communication systems may involve devices, such as laptop computers, desktop computers, mobile communications devices, etc., that are configured for communication via an optical film. The optical film may be disposed on a device, on a wall, a window, furniture, etc., according to the implementation. Many types of free space optical communication systems are provided, including line of sight and non line of sight free space optical communication systems.

17 Claims, 11 Drawing Sheets

FREE SPACE OPTICAL COMMUNICATION WITH OPTICAL FILM

FIELD OF THE INVENTION

This application relates generally to optical communication systems.

BACKGROUND OF THE INVENTION

Free space optical communication uses light to transmit data between two points. The technology is useful in many circumstances, e.g., for "remote control" devices such as those used to control televisions and other consumer electronic devices. Free space optical communication is also useful if the physical connection of transmitters and receivers would be more difficult and/or expensive, e.g., in areas where fiber optic systems are expensive in local terms. The optical links of free space optical communication systems often use infrared light, although other wavelength ranges may be used.

Although existing free space optical communication systems are generally satisfactory, it would be desirable to provide improved devices, systems and methods for free space optical communication.

SUMMARY

Improved devices and systems are provided for free space optical communication using optical films. As used herein, an "optical film" may include a single layer of film or multiple layers of film. As such, the terms "optical film," "optical film stack," "film" and the like may sometimes be used interchangeably.

Some embodiments involve using an optical film for the transmission and/or reception of light in a free space optical communication system. Some free space optical communication systems may involve devices, such as laptop computers, desktop computers, mobile communications devices, etc., that are configured for communication via an optical film. The optical film may be disposed on a device, on a wall, a window, furniture, etc., according to the implementation. Many types of free space optical communication systems are provided, including line of sight and non line of sight free space optical communication systems.

Some embodiments described herein provide an apparatus that includes the following elements: a film; a receiver configured to receive light that is transmitted substantially in a plane of the film; and a transmitter configured to transmit light substantially in the plane of the film. The film may be configured to reflect light from the transmitter out of the plane of the film and to conduct light from out of the plane of the film to the receiver.

The receiver may be one of a plurality of receivers. Likewise, the transmitter may be one of a plurality of transmitters. In some embodiments, the transmitter(s) may be disposed proximate a first edge of the film. The receiver(s) may be disposed proximate a second edge of the film. However, both the transmitter and the receiver may be disposed proximate a first edge of the film.

The film may comprise one or more types of light-extracting elements, such as grooves, holographic elements, reflective dots, etc. For example, the film may include a first plurality of grooves and/or a second plurality of grooves. The first plurality of grooves may be disposed on a first surface of the film and the second plurality of grooves may be disposed on a second surface of the film. Alternatively, the first plurality of grooves and the second plurality of grooves may both be disposed on a first surface of the film. The grooves may take various forms. For example, the grooves may be curvilinear or the grooves may be substantially straight lines. At least some of the grooves may be discontinuous.

The film may comprise multiple layers. For example, the film may comprise a first layer and a second layer. A first plurality of light-extracting elements may be disposed on the first layer and a second plurality of light-extracting elements may be disposed the second layer.

Optical communication systems that comprise the above-described apparatus are described herein. Such an optical communication system may comprise a cellular telephone, a portable digital assistant, a television, a laptop computer and/or a desktop computer having such an apparatus disposed thereon. An optical communication system may include such an apparatus disposed on an interior or exterior building surface, e.g., disposed on a window.

Alternative devices are described herein. One such device includes the following: receiving apparatus for receiving light that is transmitted substantially in a plane; transmitting apparatus for transmitting light substantially in the plane; apparatus for reflecting light from the transmitting apparatus out of the plane; and apparatus for conducting light from out of the plane to the receiving apparatus.

The receiving apparatus may comprise a plurality of receivers. The transmitting apparatus may comprise a plurality of transmitters. The reflecting apparatus and/or the conducting apparatus may comprise a film.

Such a device may be a component of an optical communication system. The optical communication system may comprise a cellular telephone, a portable digital assistant, a television, a laptop computer and/or a desktop computer having such a device disposed thereon. The optical communication system may include such a device disposed on an interior or exterior building surface. For example, the optical communication system may include such a device disposed on a window.

Transmitting devices, including but not limited to remote control devices, are provided herein. One such device includes the following: a user interface system; a film disposed on an exterior surface of the remote control device; and a transmitter configured to receive input from the user interface and to transmit corresponding light signals substantially in a plane of the film. The film may be configured to reflect light from the transmitter out of the plane of the film.

The film may comprise light-extracting elements, such as grooves, reflective dots and/or holographic elements. Some implementations may comprise a first plurality of light-extracting elements and/or a second plurality of light-extracting elements. The first plurality of light-extracting elements may be disposed on a first surface of the film and the second plurality of light-extracting elements may be disposed on a second surface of the film. Alternatively, the first plurality of light-extracting elements and the second plurality of light-extracting elements may be disposed on the same surface of the film.

In some embodiments, the film may comprise a first layer and a second layer. The first plurality of light-extracting elements may be disposed on the first layer and the second plurality of light-extracting elements may be disposed the second layer.

Various methods are provided herein. Some such methods include the following steps: forming a first set of grooves on a film; fabricating a second set of grooves on the film; configuring a receiver to receive light that is transmitted substantially in a plane of the film; and positioning a transmitter to transmit light substantially in the plane of the film. The forming process may involve forming the first set of grooves to reflect light from out of the plane of the film to the receiver. The fabricating process may involve fabricating the second set of grooves to reflect light from the transmitter out of the plane of the film.

The film may be a composite film. The forming process may involve forming the first set of grooves in a first surface of a first film. The fabricating process may involve fabricating the second set of grooves in a second surface of a second film. The method may further comprise affixing the first film to the second film. The configuring process may involve configuring a plurality of receivers to receive light that is transmitted substantially in a plane of the first film. The positioning process may involve positioning a plurality of transmitters to transmit light substantially in a plane of the second film.

The configuring process may involve disposing the plurality of receivers proximate a first edge of the film. The positioning process may involve positioning the plurality of transmitters proximate a second edge of the film. Alternatively, the configuring and positioning processes may involve disposing a plurality of receivers and a plurality of transmitters proximate the same edge of the film.

The method may further comprise disposing the film on an interior or exterior building surface, e.g., on a window. Alternatively, or additionally, the method may involve disposing the film on a device.

An apparatus may be formed via any of the foregoing methods. Such an apparatus may be used as a component of an optical communication system.

These and other methods of the invention may be implemented by various types of hardware, software, firmware, etc. For example, some features of the invention may be implemented, at least in part, by computer programs embodied in machine-readable media. The computer programs may include instructions for controlling one or more devices to perform the methods described herein.

DETAILED DESCRIPTION

While the present invention will be described with reference to a few specific embodiments, the description is merely illustrative of the invention and is not to be construed as limiting the invention. Various modifications to the present invention can be made to the preferred embodiments without departing from the true spirit and scope of the invention as defined by the appended claims. For example, the steps of methods shown and described herein are not necessarily performed in the order indicated. It should also be understood that the methods of the invention may include more or fewer steps than are indicated. In some implementations, steps described herein as separate steps may be combined. Conversely, what may be described herein as a single step may be implemented in multiple steps.

Similarly, device functionality may be apportioned by grouping or dividing tasks in any convenient fashion. For example, when steps are described herein as being performed by a single device (e.g., by a logic device), the steps may alternatively be performed by multiple devices and vice versa.

Free space optical communication devices are used in various consumer products such as remote controls for electronic equipment, for transfer of data between laptop computers and other companion devices, etc. Free space optical communication may also be used for transfer of data at very high rates (e.g., at the switching speeds of light emitting diodes ["LEDs"]) in communication systems.

Integration of traditional free space optical communication links in consumer products may have various issues. For example, traditional free space optical communication links may involve aesthetic/product design compromises, such as those caused by the visible LED of an IR port of a remote control device. Traditional free space optical communication links may be difficult to integrate with existing devices. To the extent that traditional free space optical communication links are incorporated in existing devices, the area of the transmitter and receiver are generally made relatively small, in part to avoid further compromises in product design.

Figure 1A:
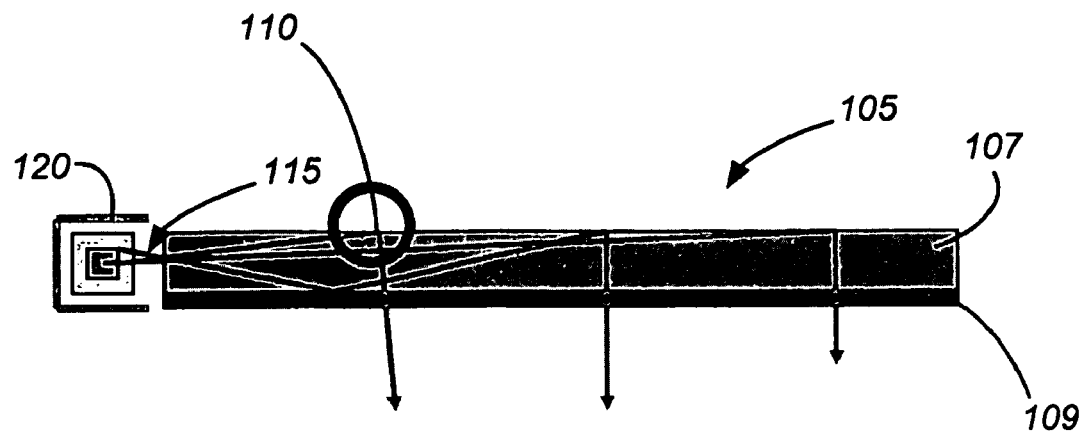
FIG. 1A depicts an optical transmitter suitable for free space optical communication, including an optical film.

FIG. 1A provides a cross-sectional view of some components that may be used for transmitting light in improved free space optical communication devices. In this example, optical film 105 is configured to reflect at least some of light 115 from optical transmitter 120 out of the plane of film 105. Here, transmitter 120 is configured to transmit light substantially in the plane of film 105. Transmitter 120 may comprise any appropriate type of optical transmitter, such as a laser diode, a light-emitting diode ("LED"), etc. Transmitter 120 may be configured to transmit light according to instructions received from a computer, a mobile communications device (e.g., a cellular telephone, a personal digital assistant, etc.) or another such device. Some examples of such devices and systems will be described herein. Although a gap is shown in FIG. 1A between transmitter 120 and film 105, in alternative implementations transmitter 120 may be adjacent to film 105.

In this example, optical film 105 is configured to convey light from transmitter 120 substantially in the plane of optical film 105, unless the light is deflected out of the plane of optical film 105 by a light-extracting element 110. Here, optical film 105 is a multi-layer film that includes a relatively high index layer 107 and a relatively low index layer 109. High index layer 107 may comprise, for example, polyethylene terephthalate ("PET"), silicon dioxide, aluminum oxide, silicon nitride, etc. Low index layer 109 may, for example, comprise glass, plastic, a polymer (e.g., an acrylic based polymer or a thermoplastic polymer such as polycarbonate), etc.

As used herein, the terms "low index," "high index" and the like are intended to mean a relatively high or low index of refraction as compared to that of other materials described herein. For example, some optical films described herein may include a "high index" material having a relatively higher index of refraction disposed adjacent to one or more "low index" materials having a relatively lower index of refraction. In some implementations, the high index material may be disposed between two low index materials. However, such terms do not necessarily mean that the "high index" material has an index of refraction that is above a predetermined threshold level. Moreover, the optical films described herein do not necessarily include relatively higher and lower index layers to convey light substantially in the plane of the film.

Figure 1B:
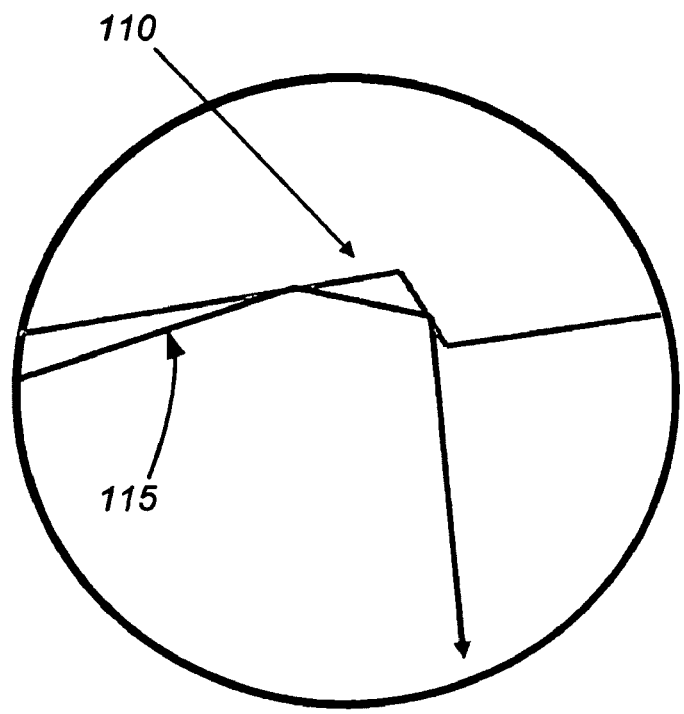
FIG. 1B provides more detail of one example of a light-extracting element that may be included in the optical film of FIG. 1A.

One example of a light-extracting element 110 is depicted in FIG. 1B, which is an enlarged view of the area depicted within the circle of FIG. 1A. In this example, light-extracting element 110 comprises surfaces which reflect some of light rays 115 out of the plane of optical film 105. Other light rays 115 from transmitter 120 may continue to propagate within optical film 105. In this example, some of this light will be reflected out of the plane of optical film 105 by other light-extracting elements 110.

Accordingly, light may be transmitted across a relatively larger area than, e.g., a transmission port of a conventional remote control device. This larger transmission area may be beneficial for a variety of reasons. Having a larger transmission area creates more transmission paths to the receiver. Some transmission paths may be obstructed or disturbed, e.g., by objects in the path and/or by local atmospheric disturbances. A larger transmission area creates possibilities for both line-of-sight and non-line-of-sight transmissions. The latter may be caused, for example, by reflection from walls or other surfaces. Accordingly, having a larger transmission area may provide a greater chance of successful reception of the transmitted signals.

Another benefit of having an optical film provide a relatively large area transmitter and/or receiver is to avoid aesthetic/product design compromises. As described in more detail below, some free space optical communication devices provided herein include optical films that may be disposed on various surfaces in a subtle and/or an aesthetically pleasing manner, if so desired. Such optical films may be disposed, for example, on surfaces of a device, of a building, of furniture, of an automobile, etc., that would normally be providing some other function (e.g., structural support). Instead of providing a larger array of visible LEDs for a transmission port of a remote control device, for example, a relatively larger area transmitter could be formed by disposing an optical film on one or more surfaces of the remote control device.

The type of light-extracting element 110 that is depicted in FIG. 1B may sometimes be referred to herein as a "prismatic" light-extracting element, as a "groove," or the like. Some implementations of optical films may include other types of light-extracting elements 110, e.g., holographic light-extracting element 110. In some implementations, a holographic film, may include light-extracting elements 110 in the form of an interference pattern that is recorded into a photosensitive material which makes up the film. In some such implementations, there may be no visible mechanical structure to the light-extracting elements 110, but instead a variation in local refraction indices that mimics similar behavior to that of a prismatic light-extracting element when light strikes them.

Other implementations may include light-extracting elements 110 in the form of highly reflective dots. Such dots may, for example, be formed by printing reflective colorant on a surface. In some such implementations, smaller dots may be more sparsely printed on a surface that is intended to be disposed closer to a light source, whereas larger dots may be printed more densely on a surface that is intended to be disposed further from a light source.

Various alternative light-extracting elements 110 are provided herein. In some embodiments, light-extracting elements 110 may be disposed on the top surface of a film. Light-extracting elements 110 that are embedded within the high index layer (or elsewhere) may be configured to extract light in a wide angle range. Such configurations still direct an acceptable amount of light to the receiver(s). It is generally acceptable if the communicated information goes in a wide range of directions. In fact, such embodiments may be advantageous in some cases, because of the enhancement of non-line-of-sight communications between source and receiver due to reflections from wall surfaces and other surfaces.

Figure 2:
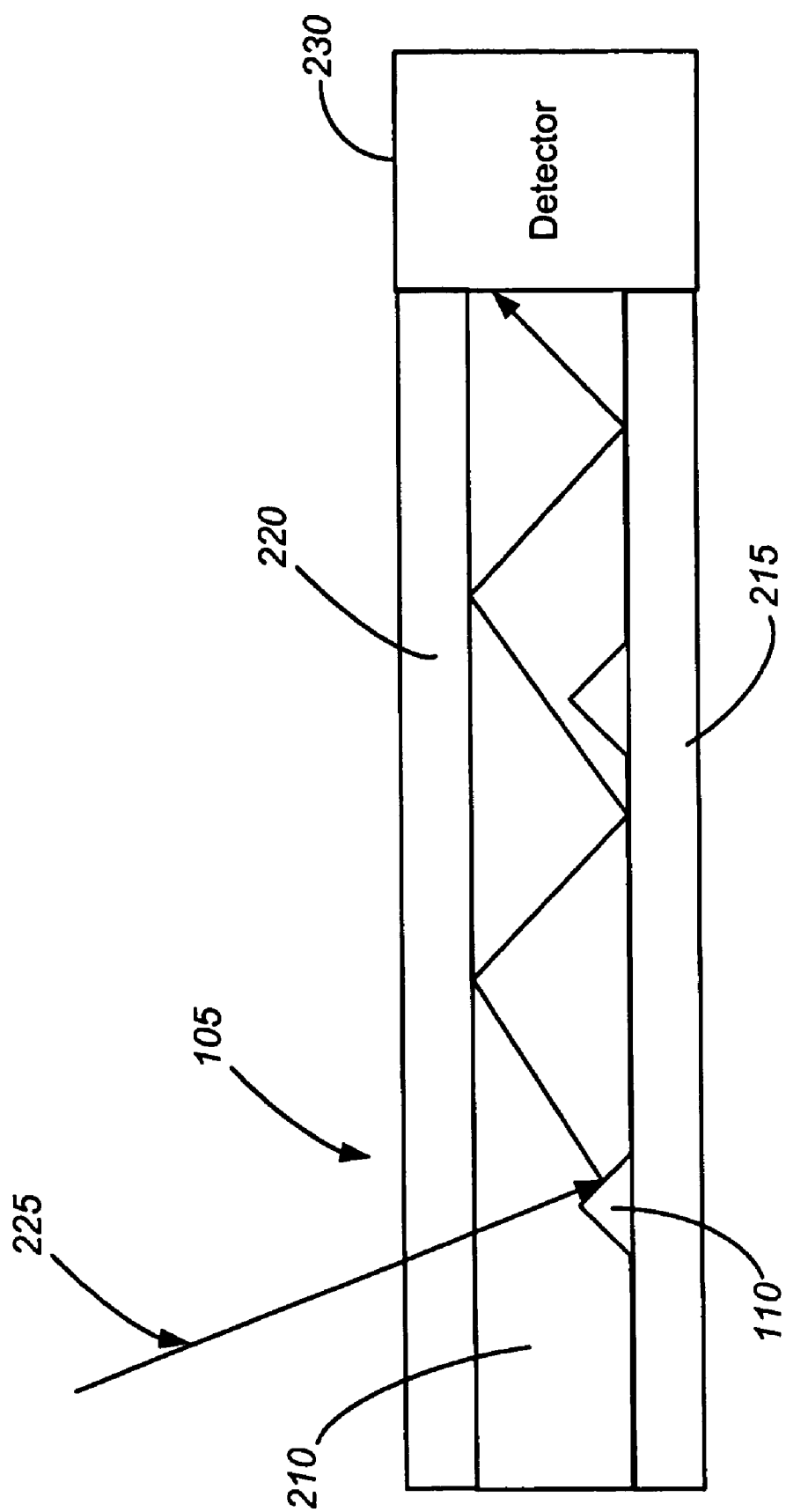
FIG. 2 depicts an optical receiver, including an optical film, suitable for free space optical communication.

FIG. 2 depicts a cross-sectional view of an optical film 105 and receiver 230 (sometimes referred to herein as a "detector") that may be used to form part of a free space optical communication system. In this example, optical film 105 includes a high index layer 210 disposed between lower index layers 215 and 220. High index layer 210 may comprise, for example, silicon dioxide, aluminum oxide, silicon nitride, etc. Low index layer 215 or 220 may comprise, e.g., glass, plastic, a polymer (e.g., such as polycarbonate), etc. Accordingly, optical film 105 is configured to conduct light 225 from out of the plane of film 105 to receiver 230. As such, optical film 105 is configured to act as an optical waveguide in this example.

Here, receiver 230 is optically coupled to optical film 105. In this example, receiver 230 comprises a photosensor or photodetector that is sensitive to electromagnetic energy (which may be generally referred to herein as "light" regardless of the wavelengths involved). Receiver 230 may, for example, comprise one or more photodiodes.

Figure 3A:
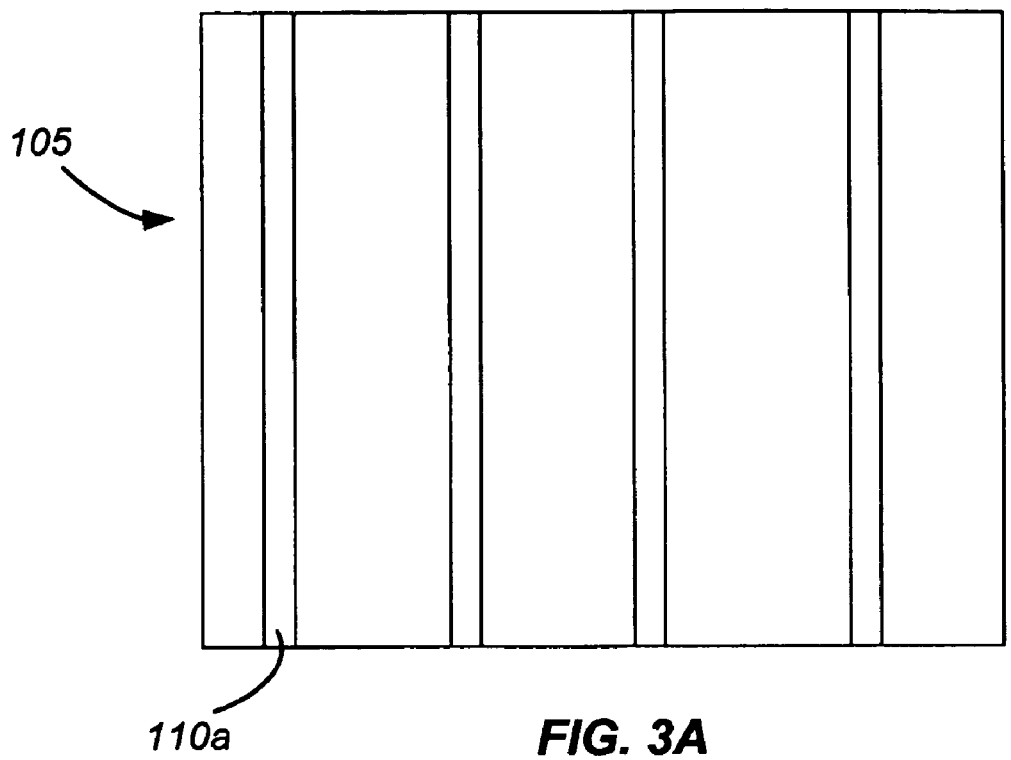
FIG. 3A depicts an optical film having light-extracting elements in the form of linear grooves.
Figure 3B:
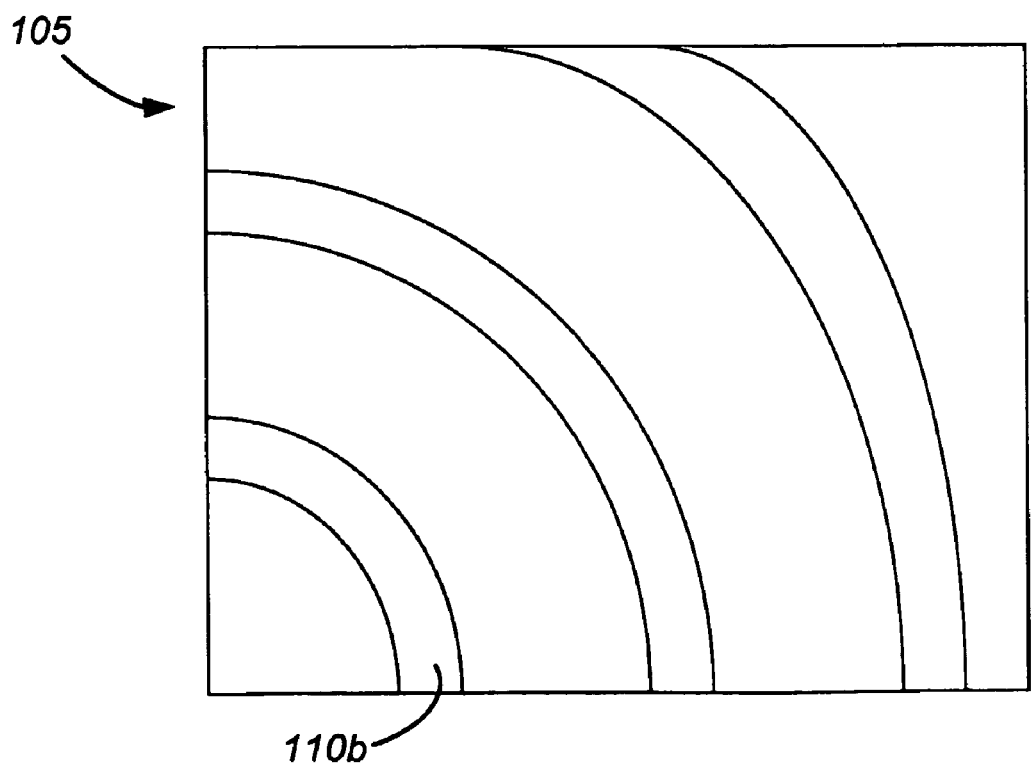
FIG. 3B depicts an optical film having light-extracting elements in the form of curvilinear grooves.

Various configurations of light-extracting elements 110 may be used in connection with the embodiments described herein. FIGS. 3A and 3B illustrate examples of optical films having light-extracting elements 110 in the form of grooves. FIG. 3A depicts an optical film 105 having light-extracting elements 110a in the form of relatively straight, linear grooves. FIG. 3B depicts an optical film 105 having light-extracting elements 110b in the form of curvilinear grooves. In these examples, the light-extracting elements 110 are continuous, but in some alternative implementations the light-extracting elements 110 are not continuous.

Figure 4A:
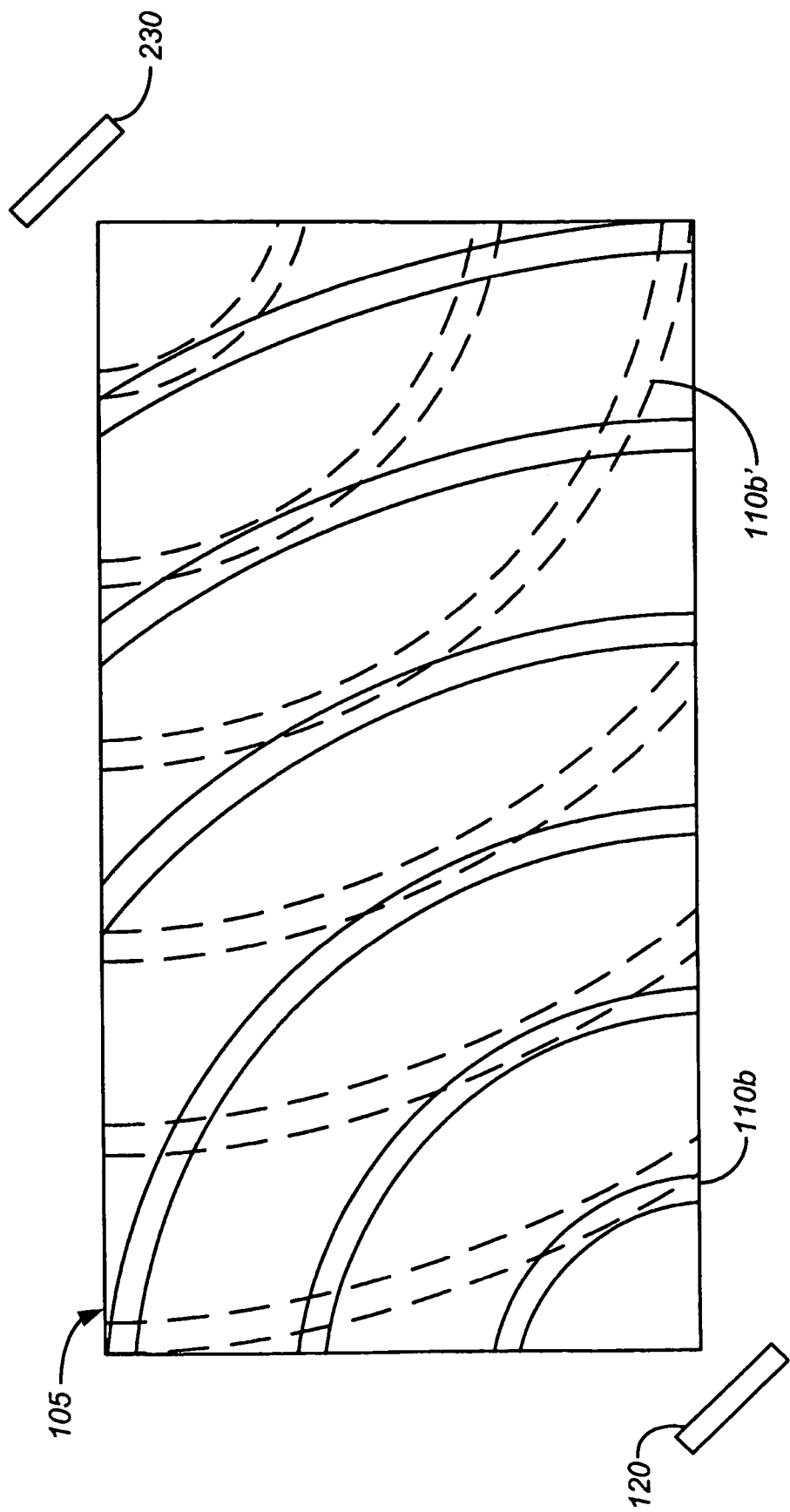
FIG. 4A illustrates a free space optical communication device that includes an optical film with light-extracting elements in the form of curvilinear grooves.

FIG. 4A illustrates a free space optical communication device that includes an optical film 105 with light-extracting elements 110 in the form of curvilinear grooves. In this example, light-extracting elements 110b are configured to reflect light from transmitter 120 out of the plane of film 105. Light-extracting elements 110b' and film 105 are configured to direct light from out of the plane of film 105 towards receiver 230. Although transmitter 120 and receiver 230 are depicted in FIG. 4A as being slightly separated from film 105, in some implementations transmitter 120 and receiver 230 are disposed proximate to film 105.

In the example depicted in FIG. 4A, light-extracting elements 110b and light-extracting elements 110b' are not formed on the same surface of film 105. Here, light-extracting elements 110b are formed on a top surface of film 105 and light-extracting elements 110b' are formed on a bottom surface of film 105.

Figure 5A:
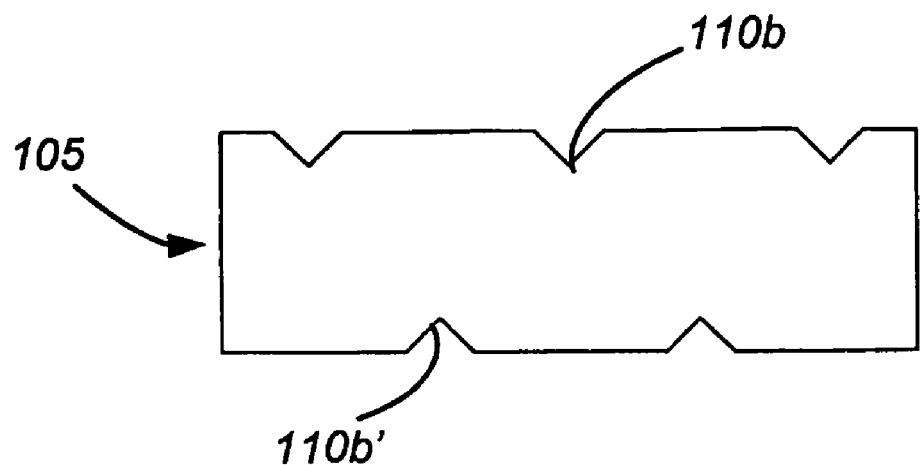
FIG. 5A depicts an optical film having light-extracting elements on opposing surfaces of a single layer.
Figure 5B:
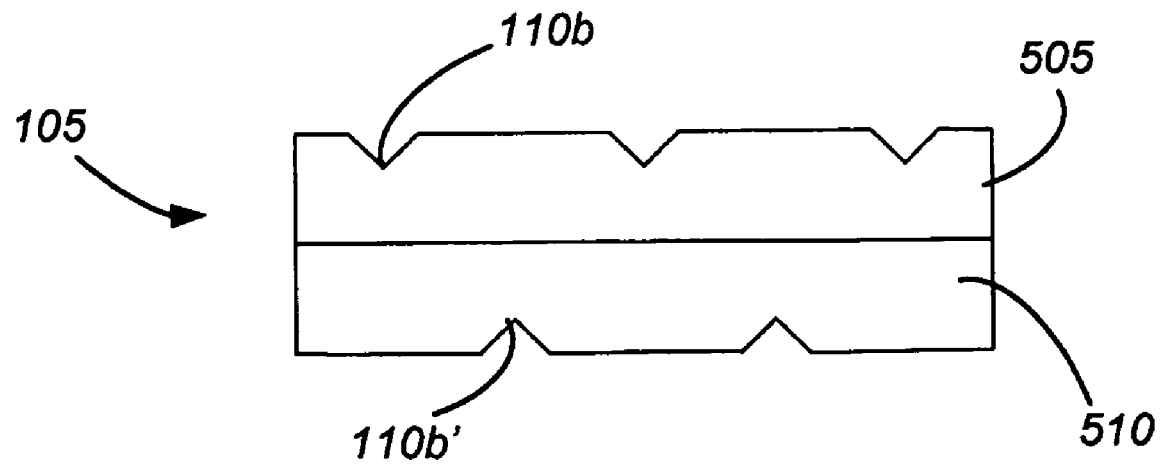
FIG. 5B depicts an optical film having light-extracting elements on more than one layer.

FIGS. 5A and 5B illustrate two examples of how such a film may be formed. In the example of FIG. 5A, light-extracting elements 110b are formed on one side of a single layer of film 105 and light-extracting elements 110b' are formed on another side of the same layer.

In the example depicted in FIG. 5B, light-extracting elements 110b are formed on a side of layer 505 and light-extracting elements 110b' are formed on a side of layer 510. Layers 505 and 510 may be attached to form film 105. In some implementations, layers 505 and 510 may be formed of a relatively high index material and may be attached via a low index material (not shown), such as a low index adhesive. A waveguide may be formed by adding low index layers to layers 505 and/or 510.

Figure 4B:
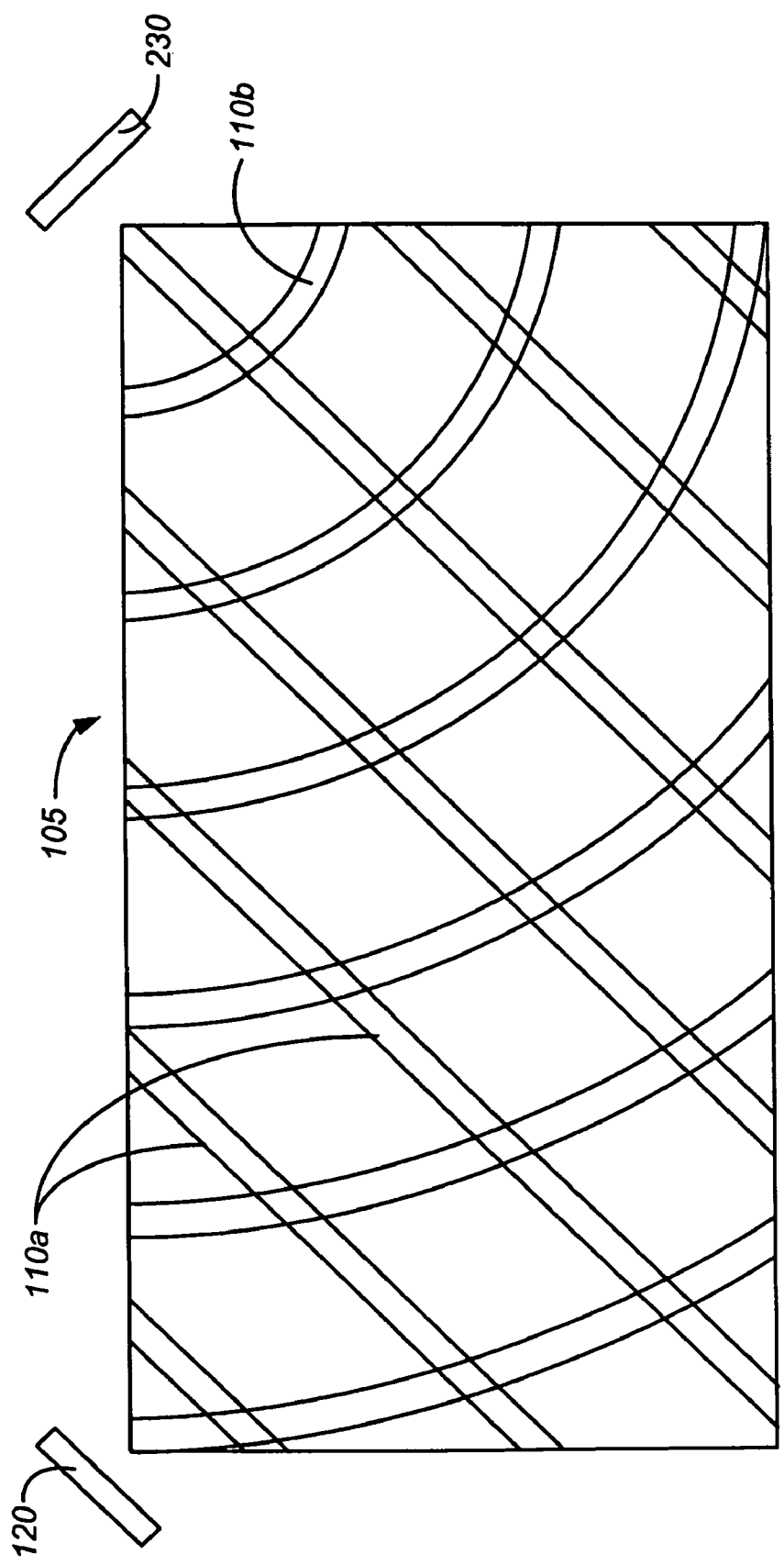
FIG. 4B illustrates a free space optical communication device that includes an optical film with light-extracting elements in the form of linear and curvilinear grooves.

FIG. 4B illustrates a free space optical communication device that includes an optical film with light-extracting elements in the form of linear and curvilinear grooves. In this example, linear light-extracting elements 110a are configured to reflect light from transmitter 120 out of the plane of film 105. Curvilinear light-extracting elements 110b and film 105 are configured to direct light from out of the plane of film 105 towards receiver 230. Although transmitter 120 and receiver 230 are depicted in FIG. 4A as being slightly separated from film 105, in some implementations transmitter 120 and receiver 230 are disposed proximate to film 105.

In the example shown in FIG. 4B, linear light-extracting elements 110a and curvilinear light-extracting elements 110b are formed on the same surface of film 105. Having linear light-extracting elements 110a disposed approximately parallel to waves emitted from transmitter 120 and approximately perpendicular to receiver 230 decreases the potential for interference between transmitted and received signals. However, in alternative embodiments, linear light-extracting elements 110a and curvilinear light-extracting elements 110b may be formed on different layers and/or surfaces of film 105.

Figure 6:
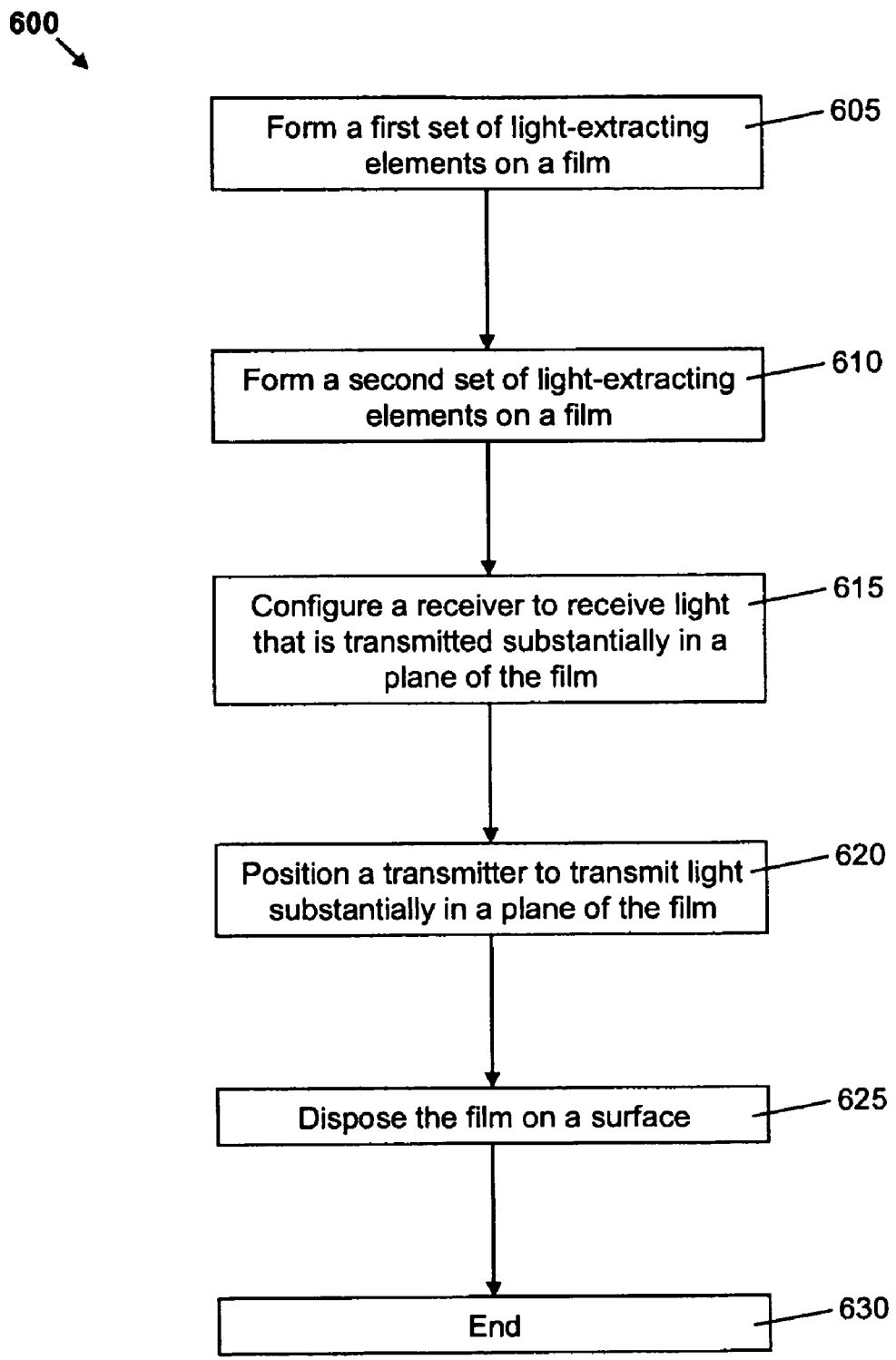
FIG. 6 is a flow chart that outlines steps of forming components of a free space optical communication system.

Flow chart 600 of FIG. 6 outlines the steps of some methods of forming a device for free space optical communication. In step 605, a first set of light-extracting elements are formed on a film. In step 610, a second set of light-extracting elements are formed on a film. As noted above with reference to FIG. 5A, in some implementations the first and second sets of light-extracting elements may be formed on different surfaces of a single film layer.

Alternatively (e.g., as described above with reference to FIG. 5B), the first and second sets of light-extracting elements may be formed on different layers. The film may be a composite or multi-layered film. The first set of grooves may be formed on a first surface of a first film and the second set of grooves may be formed on a second surface of a second film. The method may also include the step of affixing the first film to the second film, e.g., with a relatively lower index adhesive. In yet other implementations, the first and second sets of light-extracting elements may be formed on the same surface of the film (see the example described with reference to FIG. 4B).

The light-extracting elements may, for example, be grooves such as those depicted in FIG. 4A, 4B, 5A or 5B. In some implementations, such grooves (or the like) may be formed according to a stamping or embossing process. In some such implementations, light-extracting elements may be formed, at least in part, according to a roll-to-roll embossing process such as that described in co-pending U.S. patent application Ser. No. 12/255,536, entitled "Fabricating Optical Waveguides", filed on Oct. 21, 2008, which is hereby incorporated by reference.

However, the light-extracting elements need not be grooves, but could be some other form of light-extracting elements (e.g., holographic light-extracting elements or reflective dots). Moreover, at least some of the light-extracting elements may be discontinuous.

Referring once more to FIG. 6, in step 615 at least one receiver is configured to receive light that is transmitted substantially in the plane of the film, e.g., as described above with reference to FIG. 2, FIG. 4A and/or FIG. 4B. In step 620, at least one transmitter is positioned to transmit light substantially in the plane of the film, e.g., as described above with reference to FIG. 1A, FIG. 1B, FIG. 4A and/or FIG. 4B.

However, many other implementations of free space optical communication devices are provided herein. Some such implementations involve a plurality of transmitters and/or receivers. Such configurations may be advantageous, for example, in order to create redundancy in signals that are transmitted and/or received by a device. In some implementations, such redundant signals may be summed in order to increase the signal to noise ratio of data in the free space optical communication system.

Figure 7A:
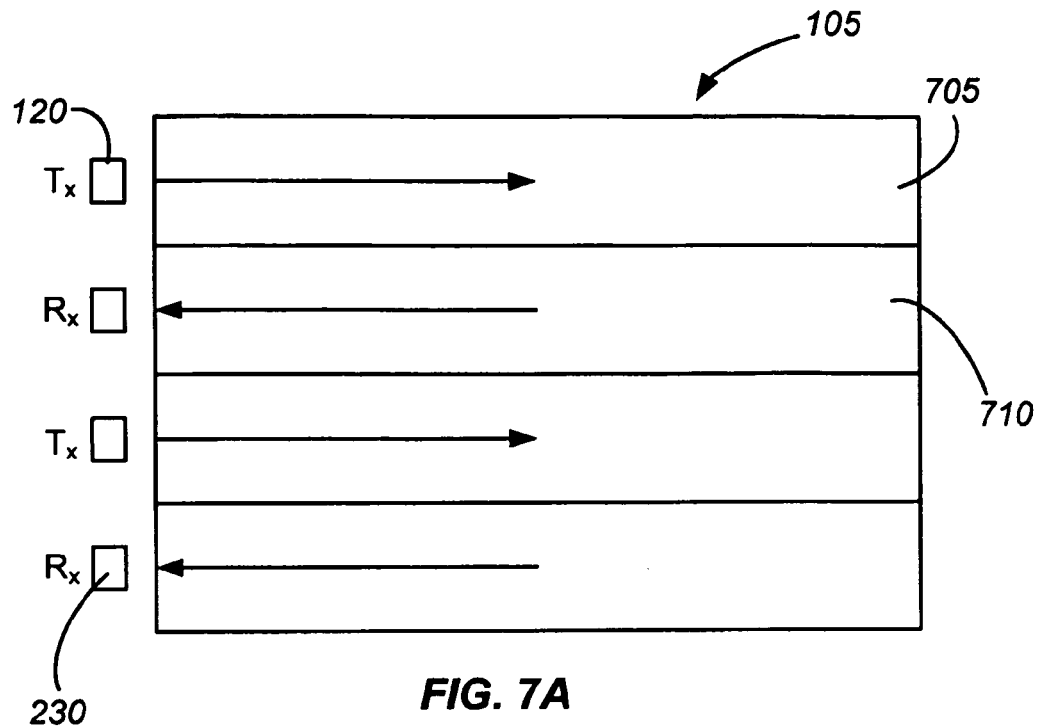
FIG. 7A illustrates a free space optical communication device that includes an optical film having zones configured for light transmission and adjacent zones configured for light reception.

One configuration having a plurality of transmitters and receivers is depicted in FIG. 7A. Here, a plurality of transmitters 120 and a plurality of receivers 230 are disposed on the same side of an optical film 105. Zones 705 of film 105 are configured to reflect at least some of the light from transmitters 120 out of the plane of film 105. Zones 710 are configured to reflect at least some of the light that is incident on film 105 to receivers 230. In alternative implementations, at least some of transmitters 120 and receivers 230 may be disposed on opposite sides of optical film 105.

Figure 7B:
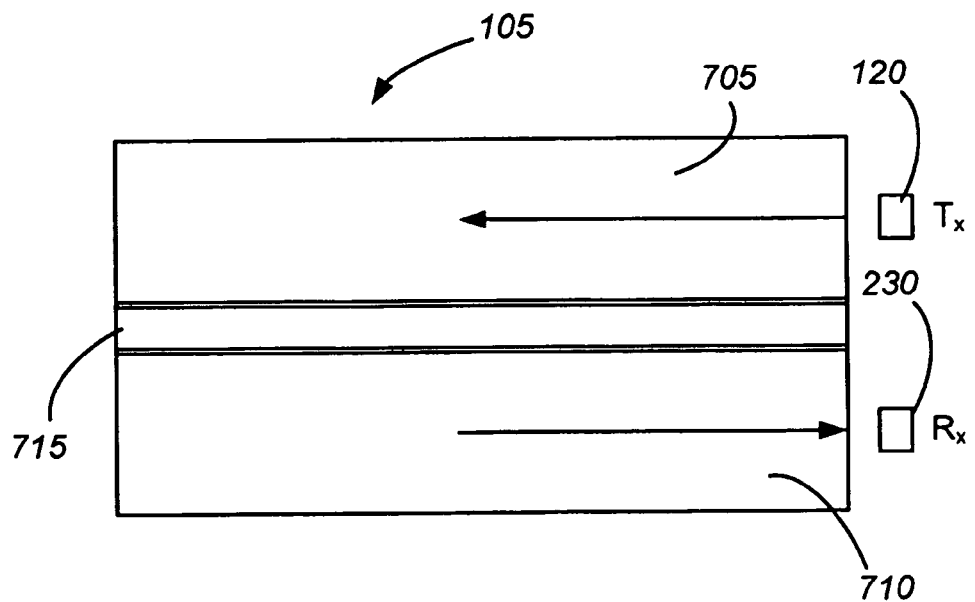
FIG. 7B illustrates a free space optical communication device that includes an optical film having zones configured for light transmission, zones configured for light reception and interstitial opaque zones.

An alternative configuration is depicted in FIG. 7B. Here, one or more transmitters 120 and one or more receivers 230 are disposed on the same side of an optical film 105. Although FIG. 7B only depicts one transmitter 120 and one receiver 230, similar implementations include a plurality of transmitters 120 and/or receivers 230. As in the embodiment depicted in FIG. 7A, zones 705 is configured to reflect light from transmitters 120 out of the plane of film 105 and zone 710 is configured to reflect at least some of the light that is incident on film 105 to receivers 230. In some implementations, transmitters 120 and receivers 230 may be disposed on opposite sides of optical film 105.

However, the configuration depicted in FIG. 7B includes one or more substantially opaque zones 715. Substantially opaque zones 715 preferably do not transmit a significant portion of light at the wavelength range(s) emitted by transmitters 120. Accordingly, such configurations may decrease the likelihood of interference between light transmitted by transmitter(s) 120 and light received by receiver(s) 230.

Returning again to FIG. 6, in step 625 the film is disposed on a surface. Some implementations of the method may involve disposing the film on a device, such as a laptop computer, a desktop computer, a remote control device, a mobile communications device, etc.

In some such implementations, a remote control device may be laminated with an optical film coupled to a transmitter. The transmitter may, for example, be hidden inside the device or located in a relatively inconspicuous location (e.g., on a side or a bottom surface). Such configurations can significantly increase the area over which the transmission of the signals occurs, as compared to a prior art remote control device. Moreover, such configurations can enable the device to provide both line-of-sight and non-line-of-sight free space optical communication.

Some implementations may involve disposing the film on a television and/or on a surface of another electronic device such as a digital video disk ("DVD") player, one or more components of a stereo system, etc. Some such implementations can allow the surface on which the optical film is disposed to function as a large area optical receiver.

Alternative implementations involve disposing an optical film on a portable communication device, on a portable player (e.g., on an iPod), on a game console, etc. Some such implementations involve disposing the optical film on (or in) a display device of a cellular telephone, on the front of the cellular telephone, etc. A device so configured can function as a wireless optical transmitter (and/or receiver) for communication with another device. The other device may be, e.g., a laptop computer, a desktop computer, a hands free device (such as a Bluetooth™ device), etc.

Some cellular telephones with a reflective display (such as an interferometric modulator display ["IMOD"]) have a front light film with an LED to illuminate the display when there is little ambient light. In some implementations, the front light film with the LED can simultaneously be used to transmit data in a free space optical communication system and to illuminate the display. In some such implementations, at least one LED may be modulated in a wavelength range outside the visible spectrum (e.g., in the infrared ["IR"] range). For example, some such devices may include two LED sources, one of which emits light in the visible range and one of which emits light in the IR range. The latter may be used as a transmitter for a free space optical communication system.

Figure 8:
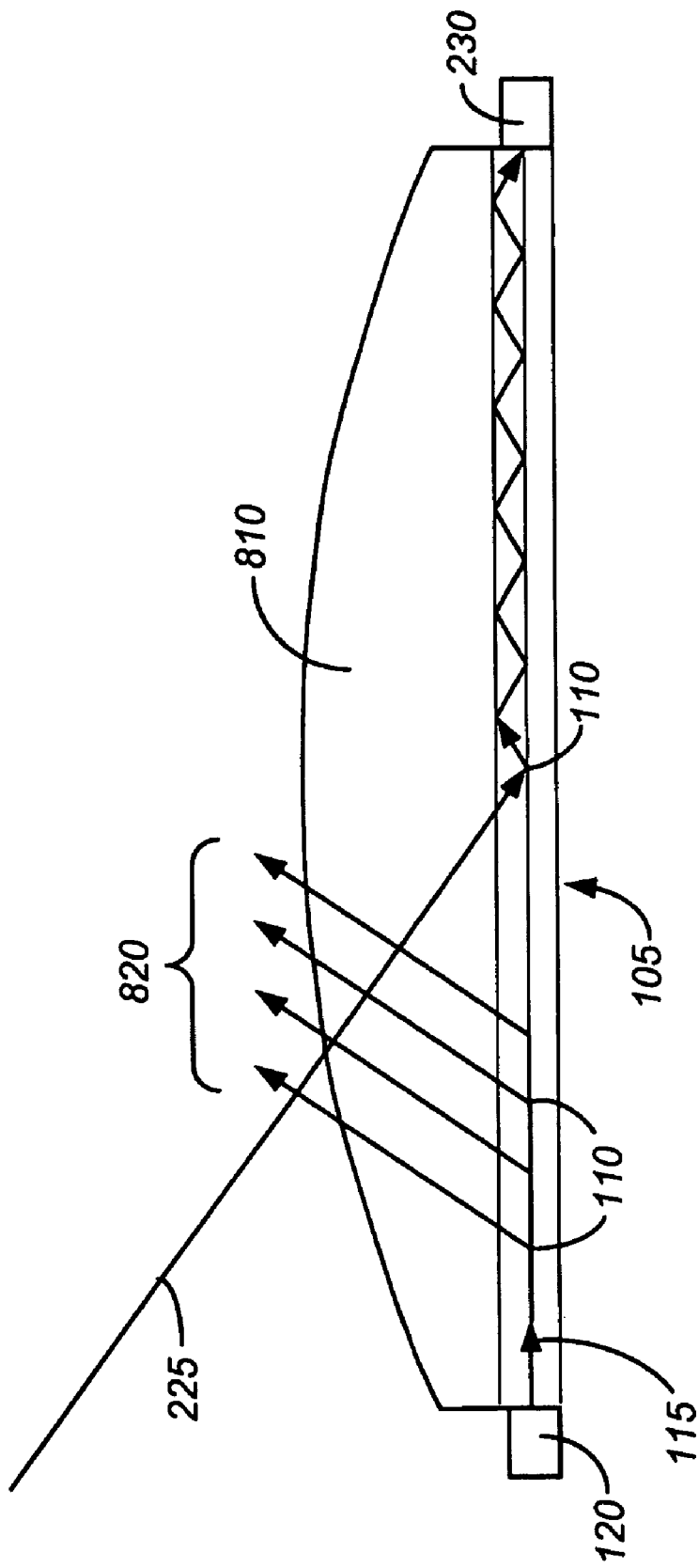
FIG. 8 is a cross-section of a free space optical communication device that uses the same optical film for light transmission and light reception.

One example of a free space optical communication device that may be used in a display of a mobile device will now be described with reference to FIG. 8. Here, optical film 110 is configured to direct at least some of the light 115 from transmitter 120 out of the plane of film 105 and through transparent display cover 810. Some of this deflected light is depicted schematically in FIG. 8 as transmitted light rays 820.

Moreover, optical film 110 is configured to direct at least some of the incident light 225 to receiver 230. In some implementations, free space optical communication signals will be transmitted within a predetermined wavelength range. In some such implementations, although a wide wavelength range of incident light may be received by receiver 230, only incident light that is within the predetermined wavelength range will be processed as free space optical communication signals.

Although it may appear that at least some light from transmitter 120 would be received by receiver 230, this is not necessarily the case. In some implementations, transmitted and received light may be conveyed by different zones of film 105, e.g., as described above with reference to FIGS. 7A and 7B. In some implementations, there may be interstitial opaque zones to prevent light from transmitter 120 from being received by receiver 230.

However, in some implementations, at least some light from transmitter 120 may be received by receiver 230. Some such implementations may apply some form of signal processing to reduce the strength of such signals. For example, a logic device (such as a processor) may be configured to create a deconvolution algorithm based on the transmitted signals and deconvolve signals received by receiver 230 according to the deconvolution algorithm. Such processing may be performed, e.g., by a logic device such as that described below with reference to FIG. 10.

Alternative implementations of the method may involve disposing the film on an interior or exterior building surface in step 625. For example, some such implementations involve disposing the film on furniture, walls and/or windows of a building. In some implementations, an optical communication link (which may be a high-speed optical communication link) can be formed between adjacent buildings using films mounted on the windows of the two buildings facing each other as transceivers.

Figure 9A:
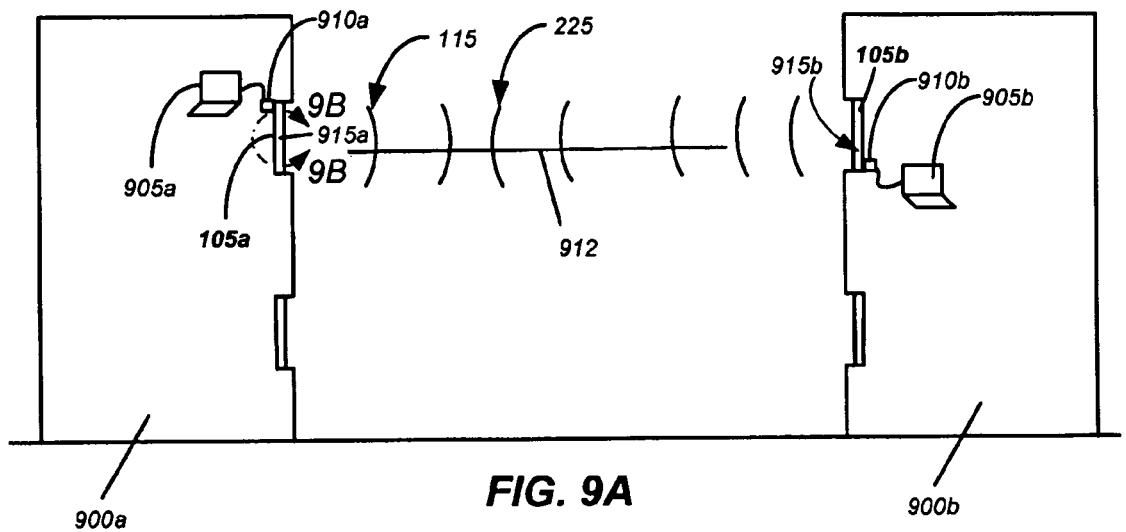
FIG. 9A illustrates a free space optical communication system that includes optical films disposed on windows.

One example of such an implementation will now be described with reference to FIGS. 9A and 9B. Referring first to FIG. 9A, optical films 105a and 105b are disposed on opposing windows 915a and 915b of buildings 900a and 900b. Here, laptop computers 905a and 905b are configured for free space optical communication with one another via films 105a and 105b and corresponding transceivers 910a and 910b.

In this example, films 105a and 105b are substantially parallel to one another, so at least some of light 115 that is transmitted by film 105a and some of light 225 that is received by film 105a from film 105b propagates along a common axis 912. Although computers 905a and 905b are configured for communication with transceivers 910a and 910b via wired connections in this implementation, in alternative implementations computers 905a and 905b may be configured for wireless communication with transceivers 910a and 910b.

Figure 9B:
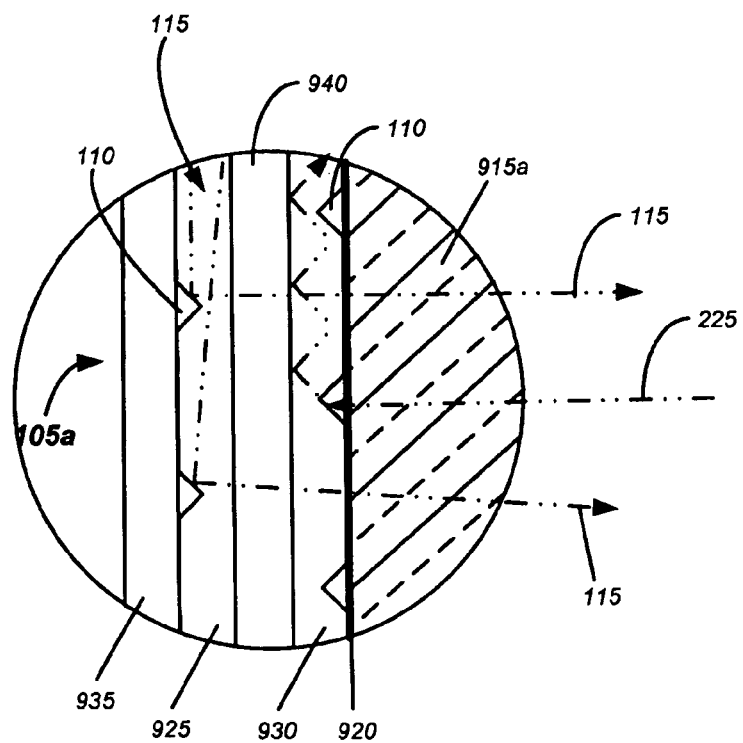
FIG. 9B depicts a cross-sectional view of the free space optical communication system of FIG. 9A and provides more detail regarding the optical film disposed on one of the windows.

FIG. 9B illustrates an enlarged view of a portion of film 105a and window 915a. In this example, film 105a is affixed to window 915a via low index adhesive layer 920. In some such implementations, low index adhesive layer 920 allows film 105a to be peeled off of window 915a without damaging film 105a and preferably without leaving a substantial amount of residual adhesive on window 915a. Here, high index layer 925 is configured with light-extracting elements 110 to reflect at least some of transmitted light 115 (from a transmitter portion of transceiver 910a) out of the plane of film 105a. High index layer 930 is also configured with light-extracting elements 110 to reflect at least some of received light 225 to a receiver portion of transceiver 910a. In this example, low index layers 935 and 940 increase the internal reflection of light within high index layers 925 and 930.

Figure 10:
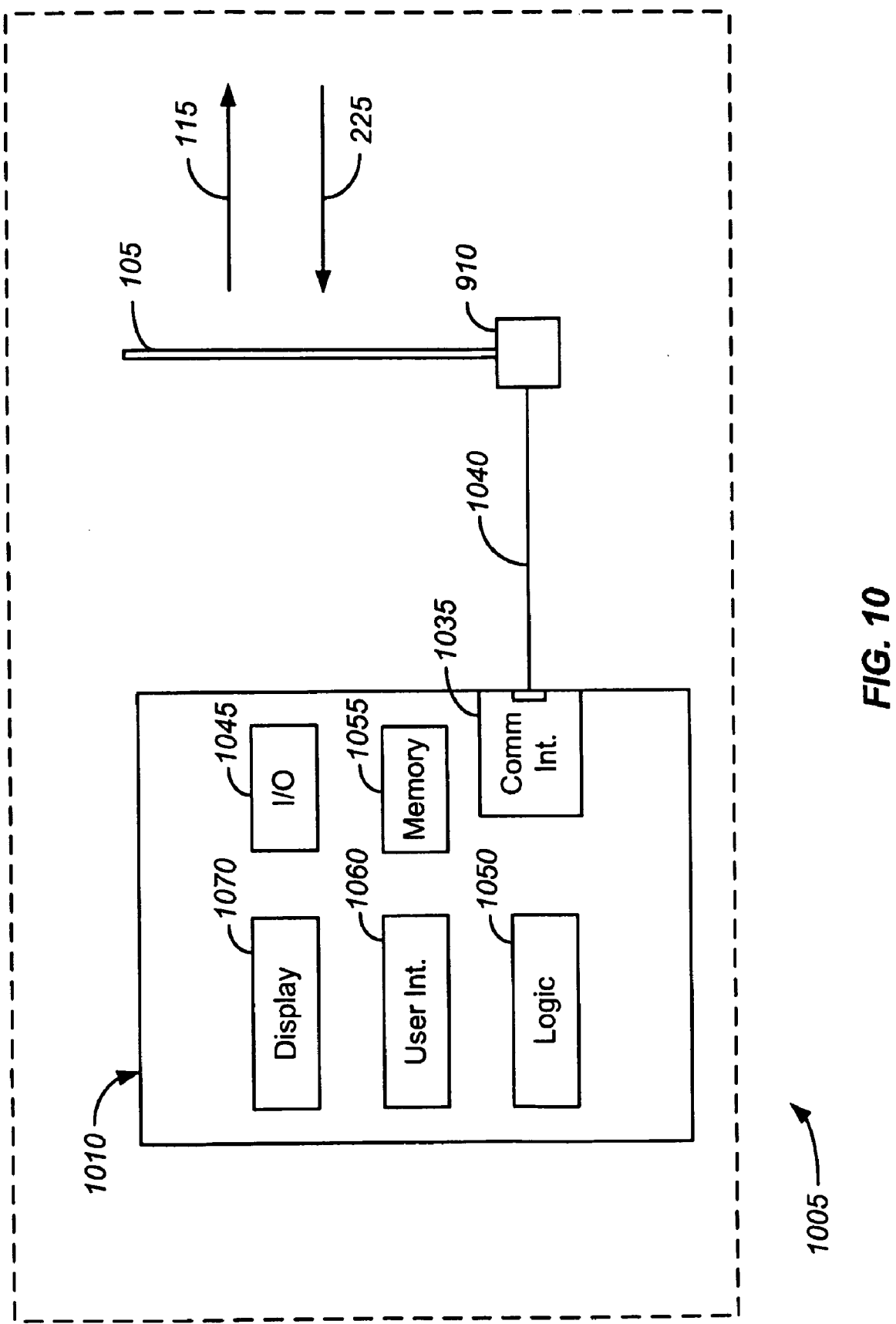
FIG. 10 is a schematic diagram of one example of a free space optical communication system.

FIG. 10 is a schematic diagram of one example of a free space optical communication system. Free space optical communication system 1005 includes optical film 105, which is configured to direct at least some of received light 225 to transceiver system 910. Optical film 105 is also configured to direct at least some of the light 115 transmitted by transceiver 910 out of the plane of film 105.

Here, device 1010 is configured for communication with transceiver 910 via communication interface 1035 and wired connection 1040. In alternative implementations, device 1010 may be configured for wireless communication with transceiver 910. Although optical film 105 and transceiver 910 are both outside of device 1010 in this implementation, in alternative implementations one or both may be coupled to device 1010. For example, optical film 105 may be disposed on one or more surfaces of device 1010. Alternatively, or additionally, transceiver system may be coupled to device 1010, disposed inside of device 1010, etc.

Input/output system 1045 may be any convenient system for communication between the various components of device 1010, including communication interface 1035, logic system 1050, memory system 1055, user interface system 1060, display system 1070, etc. In some implementations, input/output system 1045 may comprise a bus-based system. In other implementations, input/output system 1045 may comprise a point-to-point system.

Logic system 1050 may include one or more logic devices, such as processors, programmable logic devices, etc, used for the operation of device 1010. Logic system 1050 may, for example, provide signals to transceiver 910 via communication interface system 1035 according to input received from user interface system 1060. Similarly, logic system 1050 may control display system 1070, a speaker, etc., according to signals received from transceiver 910 via communication interface system 1035.

In some implementations, logic system 1050 may be configured to apply filtering and/or deconvolution algorithms, e.g., to cancel noise caused by atmospheric disturbances and/or to cancel interference caused by transmitters and receivers in the same device. Logic system may also be configured to sum the inputs received by a plurality of receivers in order to boost the signal/noise ratio.

Although illustrative embodiments and applications of this invention are shown and described herein, many variations and modifications are possible which remain within the concept, scope, and spirit of the invention. These variations should become clear after perusal of this application.

For example, although many embodiments shown herein depict optical films that are disposed on planar surfaces, alternative embodiments provide free space optical communication devices that include optical films disposed on curved and/or contoured surfaces. Some such embodiments provide optical films that are disposed on a curved surface of a remote control device, of a cellular telephone, of a display device, of a peripheral device, of a television, of a wall or ceiling, etc.

Light transmitted by a curved surface will tend to be transmitted over a wider range of angles than light transmitted by a flat surface. Light transmitted over a wider range of angles may be more likely to reflect from one or more wall surfaces, etc., before being detected by a receiver. Therefore, configurations providing optical films that are disposed on a curved surface can enhance non-line-of-sight free space optical communication, while still providing line-of-sight free space optical communication.

According to some implementations, a transmitting or receiving surface for free space optical communication may be molded into a desired shape. For example, a transmitting surface may be molded to fit one or more surfaces of a remote control device, a cellular telephone, a display device, etc. In some such implementations, light-extracting elements 110 may be formed by the molding process. Although the thickness of the surface may be small as compared to its length, width, area, etc., such a surface may or may not be a "film" as the term is generally understood. However, such a molded surface may be referred to herein as a film.

Accordingly, the present embodiments are to be considered as illustrative and not restrictive, and the invention is not to be limited to the details given herein, but may be modified within the scope and equivalents of the appended claims.

We claim:

1. An optical communication system, comprising:
a first film including first light-extracting elements;
a receiver disposed proximate an edge of the first film and configured to receive light that is reflected from the first light-extracting elements;
a second film including second light-extracting elements;
a third film disposed between the first film and the second film, the third film having a lower index of refraction than that of the first film and the second film; and
a transmitter disposed proximate an edge of the second film and configured to transmit light substantially within the second film, wherein the second light-extracting elements of the second film are configured to reflect light from the transmitter out of a plane of the second film, wherein the optical communication system is configured to be disposed on a window of a building.

2. The optical communication system of claim 1, wherein the receiver is one of a plurality of receivers.

3. The optical communication system of claim 1, wherein the transmitter is one of a plurality of transmitters.

4. The optical communication system of claim 1, wherein the first light-extracting elements include a first plurality of grooves.

5. The optical communication system of claim 4, wherein the second light-extracting elements include a second plurality of grooves.

6. The optical communication system of claim 4, wherein the grooves are curvilinear.

7. The optical communication system of claim 4, wherein the grooves are substantially straight lines.

8. The optical communication system of claim 4, wherein at least some of the grooves are discontinuous.

9. A method, comprising:
forming a first set of grooves in a first area of a first film;
fabricating a second set of grooves in a second area of a second film;
disposing a third film between the first film and the second film, the third film having a lower index of refraction than that of the first film and the second film;
disposing an adhesive layer on the second film or the first film, the adhesive layer having a lower index of refraction than that of the second film;
configuring a receiver to receive light that is transmitted substantially in a plane of the first film;
positioning a transmitter to transmit light substantially in a plane of the second film, wherein the forming involves forming the first set of grooves to reflect light from out of the plane of the first film to the receiver and wherein the fabricating involves fabricating the second set of grooves to reflect light from the transmitter out of the plane of the second film; and
configuring the first, second and third films, the receiver and the transmitter to function as an optical communication system.

10. The method of claim 9, wherein the configuring involves configuring the second film or the first film to be disposed on an interior or exterior building surface.

11. The method of claim 9, wherein the configuring involves configuring the second film or the first film to be disposed on a window of a building.

12. The method of claim 9, wherein the configuring involves configuring the second film or the first film to be disposed on a device.

13. An apparatus formed via the process of claim 9.

14. An optical communication system, comprising:
a first film including first light-extracting elements;
a receiver disposed proximate an edge of the first film and configured to receive light that is reflected from the first light-extracting elements;

a second film including second light-extracting elements;
a third film disposed between the first film and the second film, the third film having a lower index of refraction than that of the first film and the second film;
an adhesive layer disposed on the second film, the adhesive layer having a lower index of refraction than that of the second film; and
a transmitter disposed proximate an edge of the second film and configured to transmit light substantially within the second film, wherein the second light-extracting elements of the second film are configured to reflect light from the transmitter out of a plane of the second film.

15. The optical communication system of claim 14, wherein the optical communication system is configured to be disposed on an interior or exterior building surface.

16. The optical communication system of claim 14, wherein the optical communication system is configured to be affixed to a window of a building via the adhesive layer.

17. The optical communication system of claim 14, wherein the adhesive layer allows the second film to be peeled off of a surface without damaging the second film.

* * * * *